Nov. 20, 1956
ALFRED J. HANSEN
NOW BY CHANGE OF NAME
JOHN A. HANSEN
2,770,997
THREAD ARRANGEMENT FOR ENGAGED MALE AND FEMALE MEMBERS
HAVING DIFFERENT COEFFICIENTS OF THERMAL EXPANSION
Filed Jan. 16, 1952
2 Sheets-Sheet 1
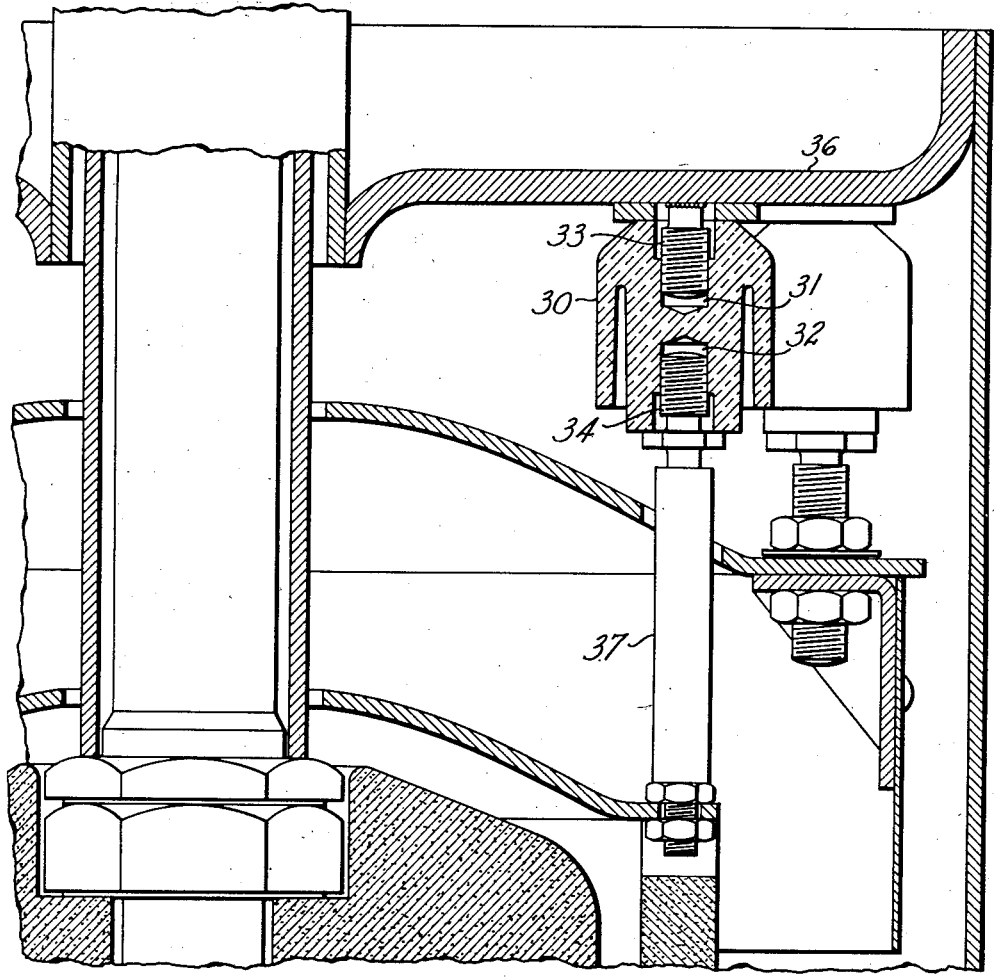
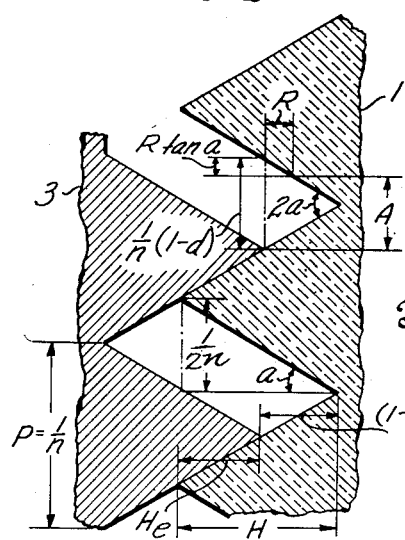
Fig. 3
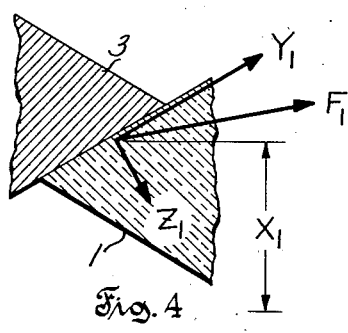
Fig. 12
Fig. 4
Inventor
Alfred J. Hansen
by John Stevens Lieb
Attorney

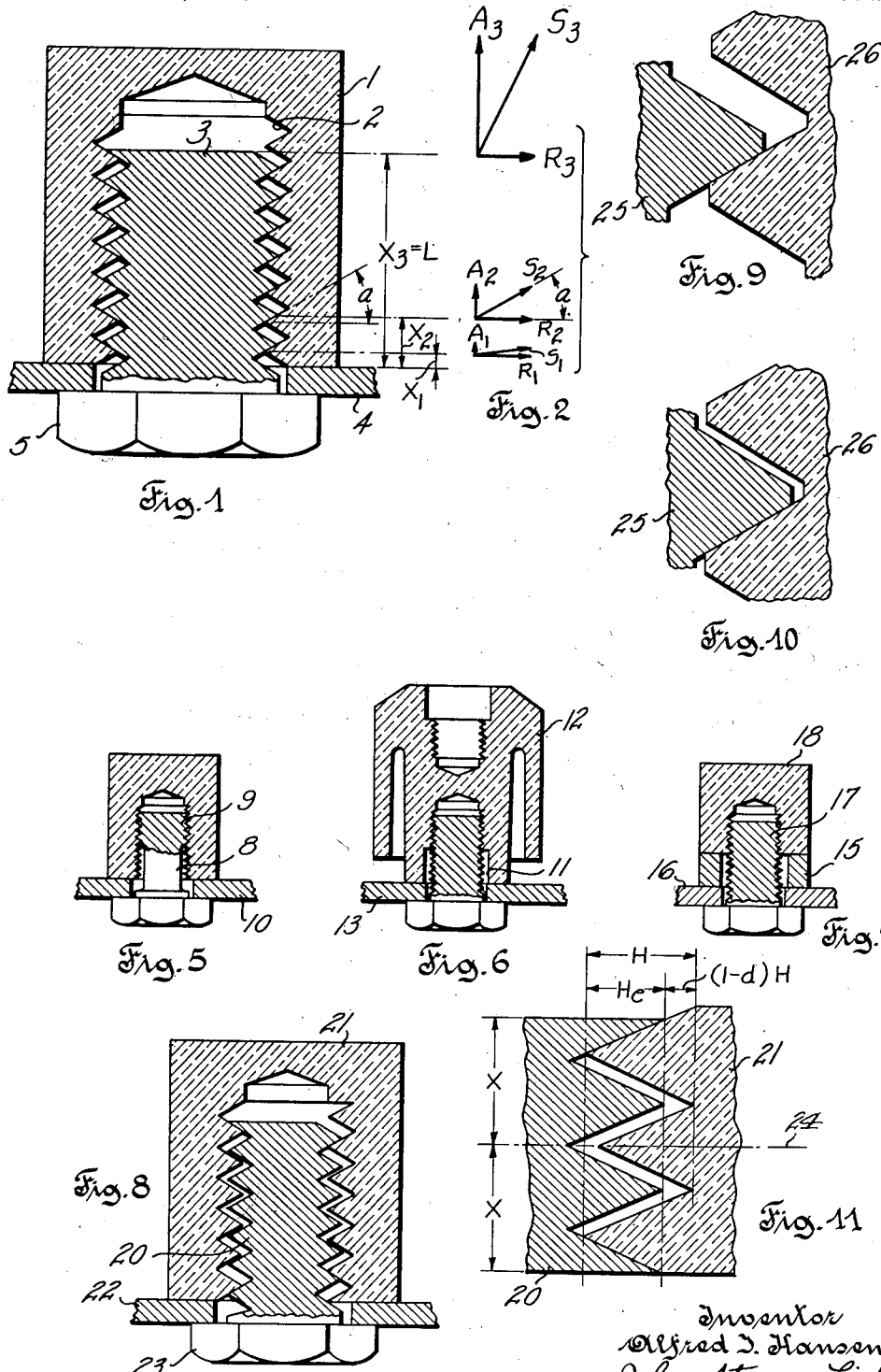

United States Patent Office 2,770,997
Patented Nov. 20, 1956

2,770,997

THREAD ARRANGEMENT FOR ENGAGED MALE AND FEMALE MEMBERS HAVING DIFFERENT COEFFICIENTS OF THERMAL EXPANSION

Alfred J. Hansen, Milwaukee, Wis., now by change of name John A. Hansen, assignor to Allis-Chalmers Manufacturing Company, Milwaukee, Wis.

Application January 16, 1952, Serial No. 266,682

5 Claims. (Cl. 85—1)

This invention relates generally to threaded means for fastening together materials having different thermal coefficients of expansion. Specifically, the invention relates to means for compensating (in a fastening means of the threaded type) for the unequal expansion of threaded mating parts which have different coefficients of thermal expansion. The invention is particularly useful in a fastening means in which one of the threaded mating parts is made of frangible material.

In an assembly of threaded mating parts in which the male threaded part has a greater thermal coefficient of expansion than the female threaded part and in which the maximum diameter of thread is appreciably greater than the pitch, there is always the problem of compensating for the unequal thermal expansion of the parts. This problem is critical when the assembly must operate over a wide range of temperatures and the male part is so screwed into the female part that the two are clamped together in a relatively immovable but severable relationship. In such an assembly the radial thermal expansion of the threaded portion of the male part nearest the clamped position is appreciably greater than the axial thermal expansion at the same position, with the consequence that the resultant thermal expansion vector is always directed against the adjoining surface of the female threads. When the expansion is great enough the resultant force may exceed the breaking stress of one or both parts.

One means heretofore proposed for compensating for this unequal thermal expansion of the threaded mating parts has been to provide the parts with the same pitch of thread but with sufficiently different major diameters to afford a generous allowance for expansion, and to assemble the parts with a loose axial fit.

However, this means of fastening the parts together is objectionable because the parts are free to vibrate in response to external vibrational forces over at least a portion of the temperature range.

If the parts are tightly screwed together to eliminate the loose axial fit then the temperature range in which no part is overstressed is narrowly limited. This is so because thermal stress components normal to the mating threads in the region of the clamped position must be absorbed by the parts themselves, there being no allowance for thermal expansion in that region.

It follows then that such prior art fastening means would not be suitable for anchoring a metal bolt tightly in a ceramic insulator where the combination must operate over a relatively wide range of temperatures, say 20° C. to 900° C. This is the range of temperatures experienced within a mercury arc rectifier during bake-out.

Some thermal expansion compensating means, therefore, beyond merely establishing loose axial and radial fits between engaging threaded parts, must be substituted if structural failure of the fastening means is to be avoided.

This invention proposes to provide a thermal expansion compensating means for a threaded fastening means which will reduce the thermal stress components normal to the mating threads to zero over a relatively wider temperature range than has heretofore been possible.

It is therefore an object of the present invention to provide an improved threaded fastening means in which the aforementioned disadvantages of the prior art are obviated and in which the aforementioned advantages are achieved.

Another object of the invention is the provision of an improved fastening means of the threaded type operable over a relatively wide temperature range for joining together in a clamped relationship bodies having different coefficients of expansion.

Another object of the invention is to provide in a severable fastening means of the threaded type improved means for compensating for the thermal expansion of mating parts which have different coefficients of expansion.

Another object of the invention is to provide an improved fastening means of the threaded type operable over a relatively wide range of temperatures for joining together frangible and infrangible bodies having different coefficients of expansion.

Another object of the invention is to provide in a threaded mated assembly of a frangible and an infrangible material improved means for preventing the breaking of the frangible material upon thermal expansion of the infrangible material.

Another object of the invention is to provide an improved threaded fastening means in which substantially all the threads of the mated parts carry the load at the upper limit of a range of temperatures and only a portion of the threads carry the load at the lower limit of the range of temperatures.

Objects and advantages other than those set forth will be apparent from the description when read together with the accompanying drawings.

In the drawings:

Fig. 1 is a section through a threaded fastening means showing the relative positions of the mating threads at the lower limit of a range of temperatures, the threads being exaggerated for the sake of clarity;

Fig. 2 is a vector diagram of displacement vectors representing the axial, radial and resultant thermal expansions of the male part of the fastening means of Fig. 1 relative to the female part;

Fig. 3 is a section through an enlarged portion of a threaded fastening means similar to Fig. 1 showing engaging threaded surfaces and identifying some of the dimensions discussed hereinafter in the specification;

Fig. 4 is a section through an enlarged portion of the threaded fastening means of Fig. 1 showing a single set of engaging threads and depicting the thermal force vectors due to the radial and axial displacement of the male part in response to a temperature rise;

Fig. 5 is a section through a threaded fastening means illustrating an embodiment of the present invention;

Fig. 6 is a section through a threaded fastening means illustrating another embodiment of the present invention;

Fig. 7 is a section through a threaded fastening means illustrating a modification of the embodiment of the present invention shown in Fig. 6;

Fig. 8 is a section through a threaded fastening means illustrating still another embodiment of the present invention, the threads being exaggerated for the sake of clarity;

Fig. 9 is a section of an enlarged portion of the fastening means of Fig. 5 showing a pair of mating threads at the lower limit of a range of temperatures;

Fig. 10 is a section of an enlarged portion of the fastening means of Fig. 5 showing a pair of mating threads at the upper limit of a range of temperatures;

Fig. 11 is a schematic representation of a section through an assembly similar to the embodiment shown in Fig. 8 identifying certain dimensions discussed hereinafter; and Fig. 12 is a section through a portion of a mercury arc rectifier showing the application of the present invention to a ceramic insulator and its support.

Since certain technical terms will be used in this specification, it is deemed advisable to list these terms now and define them for the convenience of the reader. The definitions are those given in the American Standard, Unified and American Screw Threads, ASA B1.1—1949 (Second Edition).

*Pitch.*—The pitch of a thread is the distance, measured parallel to its axis, between corresponding points on adjacent thread forms in the same axial plane and on the same side of the axis.

*Included angle.*—The included angle of a thread (or angle of thread) is the angle between the flanks of the thread measured in an axial plane.

*Flank angle.*—The flank angles are the angles between the individual flanks and the perpendicular to the axis of the thread, measured in an axial plane. A flank angle of a symmetrical thread is commonly termed the "half-angle of thread."

*Allowance.*—An allowance is an intentional difference in correlated dimensions of mating parts. It is the minimum clearance (positive allowance) or maximum interference (negative allowance) between such parts.

*Fit.*—The fit between two mating parts is the relationship existing between them with respect to the amount of clearance or interference which is present when they are assembled.

*Major diameter.*—On a straight thread, the major diameter is the diameter of the imaginary coaxial cylinder which bounds the crest of an external thread or the root of an internal thread.

*Minor diameter.*—On a straight thread, the minor diameter is the diameter of the imaginary coaxial cylinder which bounds the root of an external thread or the crest of an internal thread.

*Threads per inch.*—The number of threads per inch is the reciprocal of the pitch in inches.

*Pitch diameter.*—On a straight thread, the pitch diameter is the diameter of the imaginary coaxial cylinder, the surface of which would pass through the thread profiles at such points as to make the width of the groove equal to one-half of the basic pitch. On a perfect thread this occurs at the point where the widths of the thread and groove are equal.

*Depth of thread engagement.*—The depth of thread engagement between two mating threads is the distance, measured perpendicular to the axis, by which their thread forms overlap each other.

Before proceeding with an explanation of the present invention and how it works, it will do well to consider the general problem of compensating for thermal expansion between threaded mating parts having different coefficients of expansion. For this purpose a threaded fastening means of the prior art type will first be analyzed. Fig. 1 illustrates one such fastening means.

Fig. 1 shows a fastening means comprising an internally threaded female member 1, which may be of any material but which for purposes of illustration is considered to be made of a frangible ceramic. Into the bore 2 of the female member 1 is screwed an externally threaded male member, such as a bolt 3 which may be of any material having a coefficient of expansion greater than the coefficient of expansion of the female member 1 but which for purposes of illustration is considered to be made of an infrangible metal. The bolt 3 is tightened up sufficiently to firmly clamp a third member 4 (only a portion of which is shown in Fig. 1) firmly between the head 5 of the bolt and the female member 1. Although the third member 4 is shown as a separate element, it can be omitted or incorporated in the bolt head 5 and the shoulder of the bolt head 5 can be firmly clamped against the member 1 instead.

The pitch of the threads on the bolt 3 and on female member 1 are the same but the major diameters of both the bolt 3 and member 1 are appreciably greater than the pitch. The major diameters of the bolt 3 and member 1 however, are not the same, the female member having the greater major diameter.

Since the coefficients of expansion of the bolt 3 and female member 1 are different we may for purposes of simplification subtract the lesser from the greater and let the difference equal the relative coefficient of expansion between the two members 1, 3. This is equivalent to saying that the coefficient of expansion for the female member 1 is now zero, and the relative coefficient of expansion of the bolt 3 is now the difference between the actual coefficients of expansion for the two materials. So that hereinafter only the relative coefficient of expansion will be discussed. And to simplify our analysis the member 4 will be assumed to have the same thermal coefficient of expansion as the bolt 3.

In the following analysis no mention will be made of stresses (such as clamping or supporting stresses) due to mechanical loading of the fastening means or to internal thermal loading of the male and female members occasioned by temperature changes. The analysis will be limited to thermal stress forces induced in the female member by the thermal expansion of the male member in excess of the allowance between the members. Furthermore, since the female member 1 is to be considered the structurally weaker member of the two, no mention will be made hereinafter of the thermal stress forces exerted on the male member due to its coaction with the female member, but it should be remembered that it will at all times be thermally stressed the same as the female member.

If the temperature of the assembly of Fig 1 is now presumed to rise, the bolt 3 will proceed to expand. At some point along the axis of the assembly, say at distance $X_1$ from the surface of member 4, the radial displacement of the bolt 3 may be represented by the vector $R_1$ in Fig. 2, and the axial displacement by the vector $A_1$. The resultant displacement vector which is the vector sum of $R_1$ and $A_1$ is represented by the vector $S_1$. If Fig. 1 is examined closely it can be seen that the vector $S_1$ is directed against the face of the first thread of the female member 1. This is more clearly illustrated in Fig. 4 in which $F_1$ is the force vector produced by the displacement vector $S_1$ and in the same direction at a point $X_1$ distance from the member 4. In Fig. 4, the vector $F_1$ resolved into two components, a vector $Y_1$ along the surface of the thread, and a vector $Z_1$ normal to the surface of the thread. Since the vector $Y_1$ exerts no stress on the thread of the member 1 it can be neglected. The vector $Z_1$ however cannot be neglected, since it is directed normal to the threads of the female member 1 and can induce the member 1 to fail if it reaches a value equal to or greater than the breaking stress of the member.

In a similar manner an analysis of the displacement and force vectors due to the thermal expansion of the bolt 3 at other points along the axis of the assembly shown in Fig. 1 can be made. For example, at a point a distance $X_2$ from the member 4, the radial expansion of bolt 3 may be represented in Fig. 2 by the vector $R_2$ (which has the same value as $R_1$) and the axial expansion by the vector $A_2$ (which has a value greater than $A_1$). The vector sum of the vectors $A_2$ and $R_2$ is represented by the vector $S_2$. The distance $X_2$ was so chosen that the resultant vector $S_2$ makes an angle $a$ with the horizontal which is equal to the half-angle of the threads (the threads being symmetrical ones). Since the angles are equal, the vector $S_2$ is seen to lie along the surface of the thread of the female member 1.

An equivalent force vector $F_2$ (not shown in the drawings) would have the same direction as the vector $S_2$ and if resolved into components, similar to the vector $F_1$ in Fig. 4, would have a component normal to the thread surfaces of zero value. Thus the threads of the female member at a point $X_2$ from the member 4 are not subjected to any increase in stress due to thermal expansion of the bolt 3.

At distances greater than $X_2$ from the member 4 but less than a predetermined distance $L_{max}$. (the derivation of which will be discussed hereinafter), say at distance $X_3$, the displacement vector $S_3$ is directed away from the surface of the thread of the female member 1. Since the equivalent force vector $F_3$ (not shown) will have the same direction as $S_3$ no stress due to thermal expansion of bolt 3 will be exerted on the female member 1 at points lying a distance $X_2$ or greater (but less than $L_{max}$.) from the member 4.

It may be concluded from this analysis that the female member 1 will be subjected to stress forces due to thermal expansion on all thread surfaces lying between member 4 and a point $X_2$ distance from the member 4. A reduction in the number of threads in engagement will not eliminate these stress forces caused by thermal expansion of the bolt 3.

The present invention proposes to remedy this situation by one of four novel means illustrated respectively in Figs. 5 to 8.

(1). By undercutting, to a value equal to or less than the minor diameter, an axially extending portion 8 of the male member 9 for an axial distance from the member 10 corresponding to the distance $X_2$ in Fig. 1 and dimensioning the axial length and depth of thread engagement according to certain formulas hereinafter discussed. Fig. 5 illustrates this embodiment.

(2). By undercutting, to a value equal to or larger than the major diameter, an axially extending portion 11 of the female member 12 for an axial distance from the member 13 corresponding to the distance $X_2$ in Fig. 1 and dimensioning the axial length and depth of thread engagement according to the formulas mentioned in paragraph (1). Fig. 6 illustrates this embodiment.

(3). By inserting an annular member 15 having a smaller thermal coefficient of expansion than the male member 17 and having an axial length corresponding to $X_2$ in Fig. 1 between the member 16 and engaging threaded portions of the male member 17 and the female member 18, the axial length and depth of the engaging threaded portions being dimensioned according to the formulas mentioned in paragraph (1). Fig. 7 illustrates this embodiment, which is comparable to making the female member 12 of Fig. 6 in two parts, if desired.

(4). By choosing a pitch of thread for the male member 20 and the female member 21 such that the threads are a mismatch at the lower limit of a range of temperatures (so shown in Fig. 8) but matched at the upper limit of the range of temperatures, the axial length of thread engagement being dimensioned according to formulas discussed hereinafter.

In the embodiments of Figs. 5 and 6 the length of axial undercut is so selected as to orient the force vector due to thermal expansion of the male member on the first mating threads adjacent the undercut in a direction lying along the surface of the thread of the female member. In the embodiment of Fig. 7 the axial length of the spacing member is similarly selected to give a thermal force vector having a normal component of zero in the first thread of the female member adjacent the undercut. The depth of thread engagement and length of thread engagement are determined according to certain formulas to be developed and discussed hereinafter.

The first mating threads will therefore appear as shown in Fig. 9, which depicts a pair of engaging threads of the embodiments of the invention when the assembly is at the lower limit of the temperature range.

After the male member 25 in Fig. 9 has expanded in response to a rise in temperature, the mating threads will appear as shown in Fig. 10.

By undercutting, as shown in the embodiments of Figs. 5 and 6, and by use of the spacer as shown in the embodiment of Fig. 7, the normal components of the stress forces, which would be applied to the female member by a thermal expansion of the male member if the mating parts were as shown in Fig. 1, are entirely eliminated over a relatively wide temperature range.

The present invention therefore provides an improved fastening means which will withstand a much wider range of temperatures than prior art fastening means, which are limited to a relatively narrow range of temperatures.

The invention ably lends itself under these circumstances to anchoring ceramic insulators by means of threaded bolts and studs within the casings of vapor electric devices, such as mercury arc rectifiers, which must withstand a range of temperatures of approximately 20° C. to 900° C. during the bake-out period.

Fig. 12 illustrates such an application in which a ceramic insulator 30 having a pair of oppositely facing internally threaded bores 31, 32 is respectively anchored between the threaded metal studs 33, 34 attached respectively to the casing 36 and to the grid support 37. Since ceramic materials are generally frangible and have low tensile and compressive strengths, the invention presents a satisfactory means for firmly securing such materials to other members without fear of breaking the ceramics upon expansion of the studs over a relatively wide range of temperatures.

The axial length of undercut, as shown in the embodiments of Figs. 5, 6 and 7, as well as the axial length and depth of thread engagement, which will eliminate thermal stress force components normal to the mating threads may be determined by the following mathematical analysis, in which the following terms are identified by the symbols appearing after them:

| Terminology | Symbols | |
| --- | --- | --- |
| | Male Member | Female Member |
| Half angle of thread | $a$ | $a$ |
| Number of threads per inch | $n=1/p$ | $N=1/P$ |
| Pitch of thread | $p=1/n$ | $P=1/N$ |
| Coefficient of expansion | $k$ | $c$ |
| Major diameter of thread | $g$ | $G$ |
| Maximum length of allowable thread engagement | $M$ | |
| Axial length (See Fig. 1) | $L$ | |
| Maximum allowable length | $L_{max}.$ | |
| Depth of thread | $H$ | |
| Depth of thread engagement | $H_e$ | |
| Fraction of depth of thread engagement | $d=H_e/H$ | |
| Radial displacement due to thermal expansion | $R$ | |
| Axial displacement due to thermal expansion | $A$ | |
| Temperature rise | $t$ | |

The relative coefficient of expansion $s$ of the male and female members is determined by the equation—

$$s = k - c \qquad (0)$$

Fig. 3 shows a portion of the engaging threads of the male and female members 3, 1 prior to the thermal expansion of the male member 3 in response to a temperature rise $t$. The expected displacement due to the thermal expansion of the male member 3 may be resolved into two components, one parallel to the axis of the male member and designated by the character A, and the other at right angles to the axis and designated by the character R.

The first formulas to be developed will be those for the radial component displacement R and the axial component displacement A. See Fig. 1.

$$R = \frac{gts}{2} \qquad (1)$$

$$A = xts \qquad (2)$$

Combining Equations 1 and 2

$$\tan a = \frac{A}{R} = \frac{2x}{g} \quad (3)$$

Equation 3 can be solved for $x$, which represents the minimum length of undercut required to reduce the thermal stress component on the threads of the female member to zero. Equation 3 can be written as follows—

$$x \geq \frac{g \tan a}{2} \quad (3a)$$

The depth of thread can be written—

$$H = \frac{\cot a}{2n} \quad (4)$$

The fraction of depth of thread engagement is derived from Equation 4 as follows—

$$H_e = dH = \frac{d \cot a}{2n} \quad (5)$$

Since the space available for radial expansion may also be expressed as—

$$(1-d)\frac{\cot a}{2n} \quad (6)$$

—the expression (6) may be equated to (1), thus—

$$\frac{gts}{2} = (1-d)\frac{\cot a}{2n} \quad (7)$$

Solving (7) for the fraction of the depth of thread engagement gives—

$$d \geq 1 - tsgn \tan a \quad (8)$$

The available axial displacement is found from the equation—

$$A = stL_{max} = \frac{(1-d)}{n} - R \tan a \quad (9)$$

Solving (9) for the maximum length of the male member gives—

$$L_{max} = \frac{(1-d)}{nst} - \frac{g \tan a}{2} \quad (10)$$

But the maximum available length of allowable thread engagement is equal to the maximum length of the male member less the minimum length of the undercut. This can be expressed mathematically as—

$$M = L_{max} - X_{min}$$

or—

$$M = \frac{1-d}{nst} - g \tan a \quad (11)$$

Thus in the embodiment of Fig. 5 the axial length of the undercut portion 8 is determined by Equation 3 providing the major thread diameter $g$ and the flank angle $2a$ of the male member are known. Since Equation 3 contains no term for temperature rise, the axial length of the undercut is independent of the temperature range.

Equation 3 may be used for determining the axial length of the undercut 11 in the embodiment of Fig. 6 and also the axial length of the spacer 15 in the embodiment of Fig. 7.

The depth of thread engagement is given as a fraction in Equation 8 and in contrast to the axial length of undercut is dependent upon the range of temperature which the assembly is subjected to. Equation 8 is applicable to the embodiments of Figs. 5 to 7 inclusive.

The maximum available length of allowable thread engagement is found from Equation 11 and is a function of the temperature range and depth of thread engagement among other factors. Equation 11 is applicable to the embodiments of Figs. 5 to 7 inclusive.

The foregoing analysis furnishes the basis for properly dimensioning the structures of the embodiments shown in Figs. 5 to 7 inclusive to fulfill the stated objects of the invention.

The alternative embodiment of Fig. 8 will now be discussed and similarly analyzed mathematically to determine its proper dimensions.

Fig. 11 illustrates schematically the embodiment of Fig. 8, the head of the bolt 20 being omitted.

The maximum axial length of thread engagement is that at which the end threads of the members 20, 21 meet in surface to surface engagement. This is the condition shown in Figs. 8 and 11.

In such an assembly there is a region between axial ends of the members which may be considered as having zero displacement axially due to thermal expansion. Through this region a plane, designated by the broken line 24 in Fig. 11, can be drawn midway across the assembly to bisect the male and female members 20, 21 into two equal parts. The plane, passing through points of zero axial displacement, furnishes a base line from which to measure axial displacements. As shown in Fig. 11, the maximum length of the male member 20 is equal to $2x$.

$$L_{max} = 2x \quad (12)$$

Since the quantity $x$ in Equation 3 as well as in Equation 12 represents the distance measured from a plane of zero axial displacement to a point at which the displacement vector due to the relative expansion of the male member lies along the surface of the female thread and has a normal stress component of zero, the right hand member of Equation 3 may be substituted for $x$ in Equation 12. Hence—

$$L_{max} = g \tan a \quad (13)$$

Equation 13 is independent of the temperature range since $L_{max}$ is a function only of maximum diameter of thread and the half-angle of thread.

The embodiment of Fig. 8 is preferably limited to male members having large diameters or a large flank angle.

The fraction of depth of thread engagement may be determined similarly to the method used with the embodiments of Figs. 5 to 7 inclusive.

The space available for radial expansion is—

$$(1-d)H$$

If this expression is equated to the expression for the radial displacement R and solved for $d$, the fraction of depth of thread engagement is given as a function of major diameter, temperature rise, relative coefficient of expansion and the depth of thread, thus—

$$d = 1 - \frac{gts}{2H} \quad (14)$$

In Figs. 8 and 11 the male member 20 is given its maximum length, however if it is desired to clamp an intermediate member 22 between the head 23 of the male member 20 and the female member 21 for all temperatures within a predetermined range, an axial length of member 20 equal to half the maximum length should be selected.

The foregoing analysis prescribes a method for properly dimensioning the embodiment of Fig. 8 so that it will fulfill the stated objects of invention.

Although but four embodiments of the present invention has been illustrated and described herein, it will be apparent to one skilled in the art that various changes or modifications, singly or collectively, may be made therein without departing from the essence of the invention or from the scope of the appended claims.

It is claimed and desired to secure by Letters Patent:

1. A separable rigid structure including rigid frangible and rigid infrangible portions effectively combined for eliminating destructive stresses on said frangible portion throughout a wide temperature range, said structure comprising a female portion having a threaded section, a male portion having an enlargement at one end thereof and a complementary threaded section threadingly engaged with said female section, said male and female threaded sections respectively presenting helical first surfaces sloping radially inward and being axially inclined toward said enlargement, said first surfaces having parts clampingly interengaged at a substantially uniform clamping pressure throughout said temperature range, said male and female threaded sections also respectively presenting helical second surfaces sloping radially outward and being axially inclined away from said enlargement, said second surfaces being spaced radial and axial distances from each other when said parts of said first surfaces are clampingly interengaged at the lower end of said temperature range, said radial and axial distances being respectively equal to at least the difference between the radial and axial expansions of said threadingly engaged sections of said male and female portions within said temperature range, and a rigid intermediate portion disposed between said enlargement on said male portion and said threadingly engaged section of said female portion, said intermediate portion having substantially the same thermal coefficient of expansion as said thermal coefficient of expansion of said female portion and presenting an inner surface radially spaced from the opposed surface of said male portion, said intermediate portion further having an axial length substantially equal to the maximum radius of said threaded section of said male portion multiplied by the tangent of the angle defined between a perpendicular to the longitudinal axis of said male threaded section measured in an axial plane and one of said helical surfaces of an individual thread of said male threaded section.

2. A separable rigid structure including rigid frangible and rigid infrangible portions effectively combined for eliminating destructive stresses on said frangible portion throughout a wide temperature range, said structure comprising a female portion having a threaded section; a male portion having an enlargement at one end thereof, a complementary threaded section threadingly engaged with said female section, and a shank interposed between said enlargement and said complementary threaded section, said shank having a diameter less than the minor diameter of said female threaded section, said male and female threaded sections respectively presenting helical first surfaces sloping radially inward and being axially inclined toward said enlargement, said first surfaces having parts clampingly interengaged at a substantially uniform clamping pressure throughout said temperature range, said male and female threaded sections also respectively presenting helical second surfaces sloping radially outward and being axially inclined away from said enlargement, said second surfaces being spaced radially and axially from each other when said parts of said first surfaces are clampingly interengaged at the lower end of said temperature range, said radial and axial space, being respectively equal to at least the differences between the radial and axial expansion of said threadingly engaged sections of said male and female portions throughout said temperature range, and a rigid intermediate portion integral with said female portion disposed between the enlargement on said male portion and said threadingly engaged sections of said female portion, said intermediate portion having the same thermal coefficient of expansion as said thermal coefficient of expansion of said female portion and presenting an inner surface radially spaced from the opposed shank of said male portion, said intermediate portion further having an axial length substantially equal to the maximum radius of said threaded section of said male portion multiplied by the tangent of the angle defined between a perpendicular to the longitudinal axis of said male threaded section measured in an axial plane and one of said helical surfaces of an individual thread of said male threaded section.

3. A separable rigid structure including rigid frangible and rigid infrangible portions effectively combined for eliminating destructive stresses on said frangible portion throughout a wide temperature range, said structure comprising a female portion having a threaded section, a male portion having an enlargement at one end thereof and a complementary threaded section threadingly engaged with said female section, said male and female threaded sections respectively presenting helical first surfaces sloping radially inward and being axially inclined toward said enlargement, said first surfaces having parts clampingly interengaged at a substantially uniform clamping pressure throughout said temperature range, said male and female threaded sections also respectively presenting helical second surfaces sloping radially outward and being axially inclined away from said enlargement, said second surfaces being spaced radial and axial distances from each other when said parts of said first surfaces are clampingly interengaged at the lower end of said temperature range, said radial and axial distances being respectively equal to at least the difference between the radial and axial expansion of said threadingly engaged sections of said male and female portions within said temperature range, and a rigid intermediate portion integral with said female portion disposed between said enlargement on said male portion and said threadingly engaged section of said female portion, said intermediate portion having the same thermal coefficient of expansion as said thermal coefficient of expansion of said female portion and presenting an inner surface radially spaced from the opposed surface of said male portion, said intermediate portion further having an axial length substantially equal to the maximum radius of said threaded section of said male portion multiplied by the tangent of the angle defined between a perpendicular to the longitudinal axis of said male threaded section measured in an axial plane and one of said helical surfaces of an individual thread of said male threaded section.

4. A separable rigid structure including rigid frangible and rigid infrangible portions effectively combined for eliminating destructive stresses on said frangible portion throughout a wide temperature range, said structure comprising a female portion having a threaded section, a male portion having an enlargement at one end thereof and a complementary threaded section threadingly engaged with said female section, said male and female threaded sections respectively presenting helical first surfaces sloping radially inward and being axially inclined toward said enlargement, said first surfaces having parts clampingly interengaged at a substantially uniform clamping pressure throughout said temperature range, said male and female threaded sections also respectively presenting helical second surfaces sloping radially outward and being axially inclined away from said enlargement, said second surfaces being spaced radial and axial distances from each other when said parts of said first surfaces are clampingly interengaged at the lower end of said temperature range, said radial and axial distances being respectively equal to at least the difference between the radial and axial expansion of said threadingly engaged sections of said male and female portions within said temperature range, and a rigid separable intermediate portion interposed in clamped relationship between said enlargement on said male portion and said threadingly engaged section of said female portion, said intermediate portion having substantially the same thermal coefficient of expansion as said thermal coefficient of expansion of said female portion and presenting an inner surface radially spaced from the opposed surface of said male portion, said intermediate portion further having an axial length substantially equal to the maximum radius of said threaded section of said male portion multiplied by the tangent of the angle defined between a perpendicular to the longitudinal axis of said male threaded section measured in an axial plane and one of said helical surfaces of an individual thread of said male threaded section.

5. A separable rigid structure including rigid frangible and rigid infrangible portions effectively combined for eliminating destructive stresses on said frangible portion throughout a wide temperature range, said structure comprising a female portion having axially opposed threaded sections, male portions each having an enlargement connected to one end thereof and a threaded section threadingly engaged with a complementary one of said female sections, each of said male and female threadingly engaged sections respectively presenting helical first surfaces sloping radially inward and being axially inclined toward said enlargement, said first surfaces having parts clampingly interengaged at a substantially uniform clamping pressure throughout said temperature range, each of said male and female threadingly engaged sections also respectively presenting helical second surfaces sloping radially outward and being axially inclined away from said enlargement, said second surfaces being spaced radial and axial distances from each other when said parts of said first surfaces are clampingly interengaged at the lower end of said temperature range, said radial and axial distances being respectively equal to at least the difference between the radial and axial expansion of said threadingly engaged sections of said male and female portions within said temperature range, and rigid intermediate portions each respectively disposed between said enlargements on said male portions and said complementary threadingly engaged sections of said female portions, each said intermediate portion having substantially the same thermal coefficient of expansion as said thermal coefficient of expansion of said female portion and presenting an inner surface radially spaced from the opposed surface of said male portion, each said intermediate portion further having an axial length substantially equal to the maximum radius of said threaded section of said male portion multiplied by the tangent of the angle defined between a perpendicular to the longitudinal axis of said male threaded section measured in an axial plane and one of said helical surfaces of an individual thread of said male threaded section.

References Cited in the file of this patent
UNITED STATES PATENTS 1,045,536   Ette _____ Nov. 26, 1912